(12) United States Patent
Yan et al.

(10) Patent No.: US 8,799,448 B2
(45) Date of Patent: Aug. 5, 2014

(54) GENERATING RULE PACKS FOR MONITORING COMPUTER SYSTEMS

(75) Inventors: An Yan, Sammamish, WA (US); Christopher J. Harris, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1616 days.

(21) Appl. No.: 11/613,719

(22) Filed: Dec. 20, 2006

(65) Prior Publication Data

US 2008/0155517 A1     Jun. 26, 2008

(51) Int. Cl.
*G06F 15/173*     (2006.01)

(52) U.S. Cl.
USPC ........... 709/224; 717/121; 717/140; 717/117; 717/165; 717/159; 717/107; 717/108

(58) Field of Classification Search
USPC .......................................... 709/224; 717/140
See application file for complete search history.

(56) References Cited

U.S. PATENT DOCUMENTS

| | | | | |
|---|---|---|---|---|
| 5,615,359 A * | 3/1997 | Yung | | 1/1 |
| 5,983,277 A | 11/1999 | Heile et al. | | 709/232 |
| 6,253,195 B1 * | 6/2001 | Hudis et al. | | 707/713 |
| 6,754,664 B1 | 6/2004 | Bush | | 707/102 |
| 6,789,252 B1 * | 9/2004 | Burke et al. | | 717/100 |
| 7,039,702 B1 * | 5/2006 | Churchyard | | 709/224 |
| 7,080,142 B2 * | 7/2006 | Galloway et al. | | 709/224 |
| 7,152,075 B2 * | 12/2006 | Vining et al. | | 1/1 |
| 7,237,225 B2 * | 6/2007 | Kompalli et al. | | 717/108 |
| 7,263,525 B2 * | 8/2007 | Shin | | 1/1 |
| 7,340,513 B2 * | 3/2008 | Donatelli et al. | | 709/221 |
| 7,458,067 B1 * | 11/2008 | Tirumalai et al. | | 717/140 |
| 7,506,307 B2 * | 3/2009 | McCollum et al. | | 717/117 |
| 7,539,974 B2 * | 5/2009 | Beck et al. | | 717/117 |
| 7,590,972 B2 * | 9/2009 | Axelrod et al. | | 717/117 |
| 7,631,296 B2 * | 12/2009 | Seshadri et al. | | 717/117 |
| 7,711,811 B1 * | 5/2010 | Adams | | 709/224 |
| 7,730,007 B2 * | 6/2010 | Salahshour et al. | | 706/46 |
| 7,760,730 B2 * | 7/2010 | Goldschmidt et al. | | 370/392 |
| 7,765,540 B2 * | 7/2010 | McCollum et al. | | 717/174 |
| 7,769,899 B2 * | 8/2010 | Grabarnik et al. | | 709/246 |

(Continued)

FOREIGN PATENT DOCUMENTS

| | | |
|---|---|---|
| CA | 2 255 047 | 5/2000 |
| GB | 2 396 928 | 7/2004 |

OTHER PUBLICATIONS

DeltaXML Ltd., "DeltaXML—Change Control for XML," http://www.deltaxml.com/, 2000, 4 pages.

(Continued)

*Primary Examiner* — Greg C Bengzon (74) *Attorney, Agent, or Firm* — Louis Bowman; Jim Ross; Micky Minhas (57) ABSTRACT

Improved systems and methods for developing rule packs can include receiving monitoring rules specified in a markup language, and combining them to produce a rule pack. Combining processes can leverage product development processes such as Integrated Development Environments (IDEs), thereby allowing any number of developers to work on the same rule pack simultaneously. Common settings may be added to rule packs in an automated, platform-specific way, thereby eliminating the need for rule writers to concern themselves with such common settings. Rule packs may be converted from a markup language to a binary file for use by a monitoring service.

18 Claims, 6 Drawing Sheets

(56) References Cited

U.S. PATENT DOCUMENTS

| | | | |
|---|---|---|---|
| 7,805,452 B2* | 9/2010 | Kano et al. | 707/756 |
| 7,885,983 B2* | 2/2011 | Fabret et al. | 707/803 |
| 7,899,903 B2* | 3/2011 | Sanghvi et al. | 709/224 |
| 7,900,201 B1* | 3/2011 | Qureshi et al. | 717/174 |
| 7,917,911 B2* | 3/2011 | Bansal et al. | 719/313 |
| 7,925,658 B2* | 4/2011 | Colaco et al. | 707/756 |
| 7,991,802 B2* | 8/2011 | Chen et al. | 707/803 |
| 7,992,134 B2* | 8/2011 | Hinchey et al. | 717/126 |
| 8,010,570 B2* | 8/2011 | Sweeney | 707/791 |
| 8,065,368 B2* | 11/2011 | Raikar et al. | 709/206 |
| 8,078,619 B2* | 12/2011 | Bansal et al. | 707/736 |
| 8,150,816 B2* | 4/2012 | Lim | 707/694 |
| 8,180,724 B1* | 5/2012 | Qureshi et al. | 706/50 |
| 8,307,339 B2* | 11/2012 | Sundararajan et al. | 717/120 |
| 8,365,137 B2* | 1/2013 | Fant | 717/104 |
| 8,555,238 B2* | 10/2013 | White et al. | 717/100 |
| 8,631,114 B1* | 1/2014 | Bauer et al. | 709/224 |
| 2001/0052112 A1* | 12/2001 | Mohan et al. | 717/1 |
| 2002/0147606 A1* | 10/2002 | Hoffmann et al. | 705/1 |
| 2002/0170032 A1* | 11/2002 | Beaven et al. | 717/104 |
| 2003/0046317 A1 | 3/2003 | Cseri et al. | 715/513 |
| 2003/0069908 A1* | 4/2003 | Anthony et al. | 707/513 |
| 2003/0158919 A1* | 8/2003 | Fomenko | 709/220 |
| 2003/0163329 A1* | 8/2003 | Bolene | 705/1 |
| 2003/0163799 A1 | 8/2003 | Vasilik et al. | 717/100 |
| 2003/0200506 A1* | 10/2003 | Abe et al. | 715/513 |
| 2004/0044729 A1* | 3/2004 | Foerg et al. | 709/203 |
| 2004/0064731 A1* | 4/2004 | Nguyen et al. | 713/201 |
| 2004/0073913 A1* | 4/2004 | Fairweather | 719/328 |
| 2004/0268304 A1 | 12/2004 | Kuo et al. | 717/109 |
| 2006/0161894 A1* | 7/2006 | Oustiougov et al. | 717/121 |
| 2006/0230309 A1* | 10/2006 | Kromer et al. | 714/11 |
| 2007/0005344 A1* | 1/2007 | Sandor et al. | 704/9 |
| 2007/0006176 A1* | 1/2007 | Spil et al. | 717/135 |
| 2007/0011652 A1* | 1/2007 | Schneider | 717/116 |
| 2007/0094199 A1* | 4/2007 | Deshpande et al. | 706/47 |
| 2007/0094212 A1* | 4/2007 | Das et al. | 706/50 |
| 2007/0150855 A1* | 6/2007 | Jeong | 717/106 |
| 2007/0157073 A1* | 7/2007 | Varma | 715/501.1 |
| 2007/0192465 A1* | 8/2007 | Modarressi | 709/223 |
| 2008/0098454 A1* | 4/2008 | Toh | 726/1 |
| 2008/0177689 A1* | 7/2008 | Jeng et al. | 706/47 |

OTHER PUBLICATIONS

Hardwick, J., "Microsoft Operations Manager 2005 Resource Kit & Virtual PC 2004 SP1 Released," http://blogs.msdn.com/nickmac/archive/2004/10/14/242055.aspx, 2004, 2 pages.

Stylus Studio® and DataDirect XQuery™, "XML Schema Editor," http://www.stylusstudio.com/xml_schema_editor_html, 2004, 5 pages.

* cited by examiner

GENERATING RULE PACKS FOR MONITORING COMPUTER SYSTEMS

BACKGROUND

The processes that are currently available to build rule packs for monitoring and management products such as MICROSOFT® Operations Manager (MOM) have a number of problems. They require the development of the rule pack within the management tool interface which means that the management tool must be installed. They are complex and confusing, exposing more options than are necessary. They do not allow multiple developers to work on a same rule pack at the same time without interfering with each other. They use binary source files that are not compatible with current source control management processes. They do not allow easy mixing and matching of various rule sets to create custom versions of a rule pack for different product Stock Keeping Units (SKUs). For example, it is difficult to build a custom rule pack for the MICROSOFT® Small Business Server line of products, which typically does not need the as many rules as the MICROSOFT® Exchange line of products. These problems make the development of rule packs costly and error prone.

SUMMARY

In consideration of the above-identified shortcomings of the art, the present invention provides improved systems and methods for developing rule packs for monitoring products. In one embodiment, a novel system may include a subsystem for receiving a plurality of monitoring rules specified in a markup language. Rules for a rule pack may be written in a text editor such as Notepad (or any XML editor), and delivered to such subsystem. A subsystem may next combine the plurality of monitoring rules to produce a rule pack. This subsystem may leverage product development processes such as those supplied by Integrated Development Environments (IDEs), thereby allowing any number of developers to work on the same rule pack simultaneously, and allowing a domain expert to "own" the development of the rules for their domain. A subsystem may then add common settings to the rule pack, thereby eliminating the need for rule writers to concern themselves with such common settings, and allowing them to focus on the essence of the rules. Finally, a subsystem may convert the rule pack from a markup language to a binary file for use by a monitoring service. Other advantages and features of the invention are described below.

BRIEF DESCRIPTION OF THE DRAWINGS

The systems and methods for generating rule packs in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
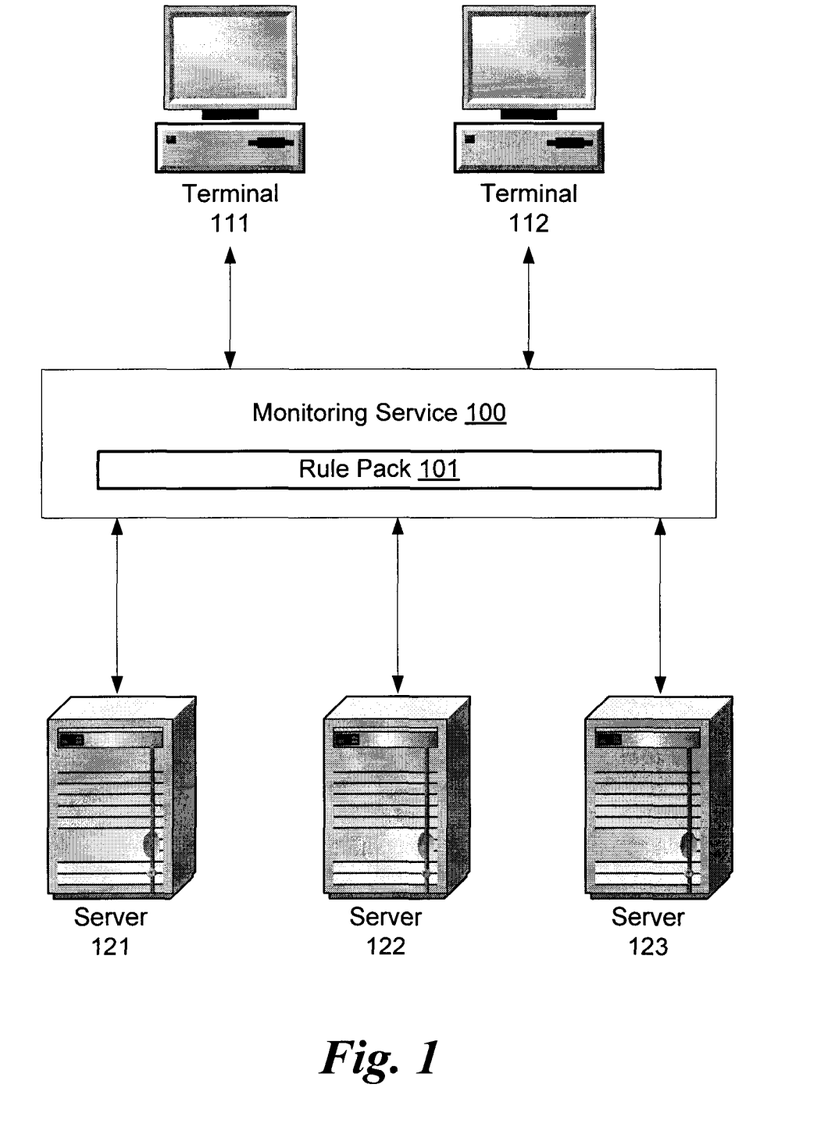
FIG. 1 illustrates a broad view of a monitoring service 100 which may benefit from various aspects of the disclosure provided herein.

FIG. 1 illustrates a broad view of a monitoring service 100 which may benefit from various aspects of the disclosure provided herein. Very generally, a monitoring service 100 allows technicians and/or software at terminals 111, 112, to be alerted to operations, activities, errors, occurrences, diagnostic statistics, and so forth of monitored computers such as servers 121, 122, 123.

The operations of servers 121-123 are generally characterized by one or more "events." An event is any occurrence within a computer system 121-123. For example, the occurrence of certain identifiable software or hardware errors may be considered an event. The opening of a new application on a computer 121 is an event, as is the accessing of a file that may be stored on computer 121 or elsewhere. Processor operations such as interrupts and context switches are events. Some events are advantageous to monitor, and others are not. Relevant events are necessarily determined on a case-by case basis that is unique to the systems 121, 122, 123 that are monitored and the business priorities of those conducting the monitoring.

A monitoring service 100 may also monitor more general performance criteria for the monitored computers 121-123. Performance criteria factors such as average processor use, memory use, and percent of full disk space may be gathered and reported by the monitoring service 100 to technicians at terminals 111, 112. In this regard, the various performance criteria data that is gathered by monitoring service 100 may be defined by the rule pack 101, as may any alerts that are provided to technicians 111, 112 for example when any such performance criteria factors reach a predefined threshold as established by a rule in the rule pack.

The events and performance criteria that are monitored and the alerts that are generated may be governed by a rule pack 101. It is advantageous to allow the rule pack 101 to be updated with new rules that may give new events, new alerts, and new performance criteria to gather. Thus it is generally advantageous to have a monitoring service 100 into which new and updated rule packs 101 may be loaded, if necessary, as business priorities and configurations of servers 121, 122, and 123 change.

One popular monitoring service software product in use today is MOM. In MOM, rule packs are sometimes referred to as management packs, and these terms are considered interchangeable here. A product such as MOM may include diverse functions such as an administrator console, operator console, and reporting console, each of which generally comprises a Graphical User Interface (GUI) viewable at a terminal such as 111. The administrator console allows a technician to configure product operations, discover servers, deploy agents, create and maintain user privileges, and create, import, and/or exports rule packs. An operator console may provide a view into the health of computer systems, indicate problems, recommend resolutions, and add company-specific troubleshooting information. A reporting console allows viewing events, alerts, and performance reports from a Web browser, and may allow users to subscribe to favorite reports and automatically receive new versions as they change.

A product such as MOM may further allow scalability by allowing a large or small number of computer systems 121. 122. 123 to be monitored. It can allow users to define, export, import, and launch context-sensitive tasks and diagnostics. These can run on a terminal 111, a server that hosts service 100, or at a software agent installed on a monitored computer system 121, 122, 123. These tasks may include pinging a machine, flushing a DNS cache, or removing lingering objects from an active directory. MOM can allow switching a server 121 into a maintenance mode, allowing technicians to prevent alerts from being displayed in the terminal 111 while a system is undergoing maintenance. Rule overrides allow for changing default parameters and thresholds for selected computers or groups and for setting precedence to prevent potential conflicts caused by multiple overrides. An auto alert resolution function can enable the agent to automatically update the MOM database when an alert has been corrected without operator intervention.

MOM also recognizes and monitors specific instances within a system. For example, it identifies specific databases within SQL Server, not just SQL Server, in general. This allows monitoring to be more detailed. In a clustered server environment, MOM provides cluster-aware monitoring by recognizing a virtual cluster server as well as the physical servers. This ability to instrument servers within a cluster allows rule pack authors to create more granular rules. The logical grouping of computers can be further subdivided to provide context for managing similar systems. For example, within the SQL Server 2000 Computer Group, there may be a computer group for Payroll and one for Order Fulfillment—each with different rules associated with it. Moreover, responses to an alert can be executed by the agent prior to the alert being suppressed.

A monitoring service 100 may also provide a variety of useful views. For example, a state view can provide technicians at terminals 111, 112 with a real-time, consolidated look at the health of the servers 121, 122, 123 within the managed environment by server role, such as active directory domain controllers, highlighting the systems that require attention. A diagram view can provide technicians with a variety of topological views where the existence of servers and relationships are defined by rule packs. A diagram view can allow technicians to see the status of the servers, access other views, and launch context-sensitive actions, helping them navigate quickly to the root of a problem. An alerts view can provide a list of issues requiring action and the current state and severity of each alert. The alerts view may indicate whether the alerts have been acknowledged, escalated, or resolved, and whether a service level agreement has been breached. A performance view can allow technicians to select and display one or more performance metrics from multiple systems over a period of time. An events view can provide a list of events that have occurred on managed servers, a description of each event, and the source of the problem. A computers and groups view can allow technicians to see the groups to which a computer such as 121, 122, or 123 belongs, the processing rule groups with which it is associated, as well as the attributes of the computer.

A monitoring service 100 may provide a range of security features, including for example an ability to run under a network service account in the Microsoft Windows Server 2003 operating environment. This type of account has lower permissions than a local system account and enhances the security of the monitoring service. A monitoring service may also allow for the creation of customized views, for example, to restrict a specific user to access and manage only a certain subset of computer groups. Scoping can be used to isolate users, such as a technician at 111 and a technician at 112, preventing them from seeing and acting on each other's systems. The communication between a monitoring service agent running on a server 121 and a management server that hosts the service 100 can be encrypted and digitally signed by default. For increased security, the encryption may be based upon a dynamically-created key, rather than a static key. Dynamic keys make it harder to view data that is transferred between components such as agent and monitoring service.

A monitoring service 100 may also be deployed so as to monitor servers that are not equipped with monitoring service agents. The ability to monitor servers that are not equipped with monitoring service agents is useful in IT environments where agents cannot be installed on a few exception nodes. Agentless monitoring may be limited to status monitoring only. A monitoring service 100 may furthermore provide 64-bit agent support, allowing technicians to manage, for example, applications running on 64-bit operating systems based on Intel IA-64 and AMD-64 platforms. It is also useful for a monitoring service 100 to support international use, for example by operating in multi-language and localized environments. Console software running at terminals 111, 112, and rule packs 101 can be advantageously localized for languages such as English, French, German, and Japanese. A server discovery wizard may allow for server lists to be imported from active directory, from a file, or from a typed list. It may also allows the list to be filtered using LDAP queries, as well as name- and domain name-based wildcards.

Figure 2:
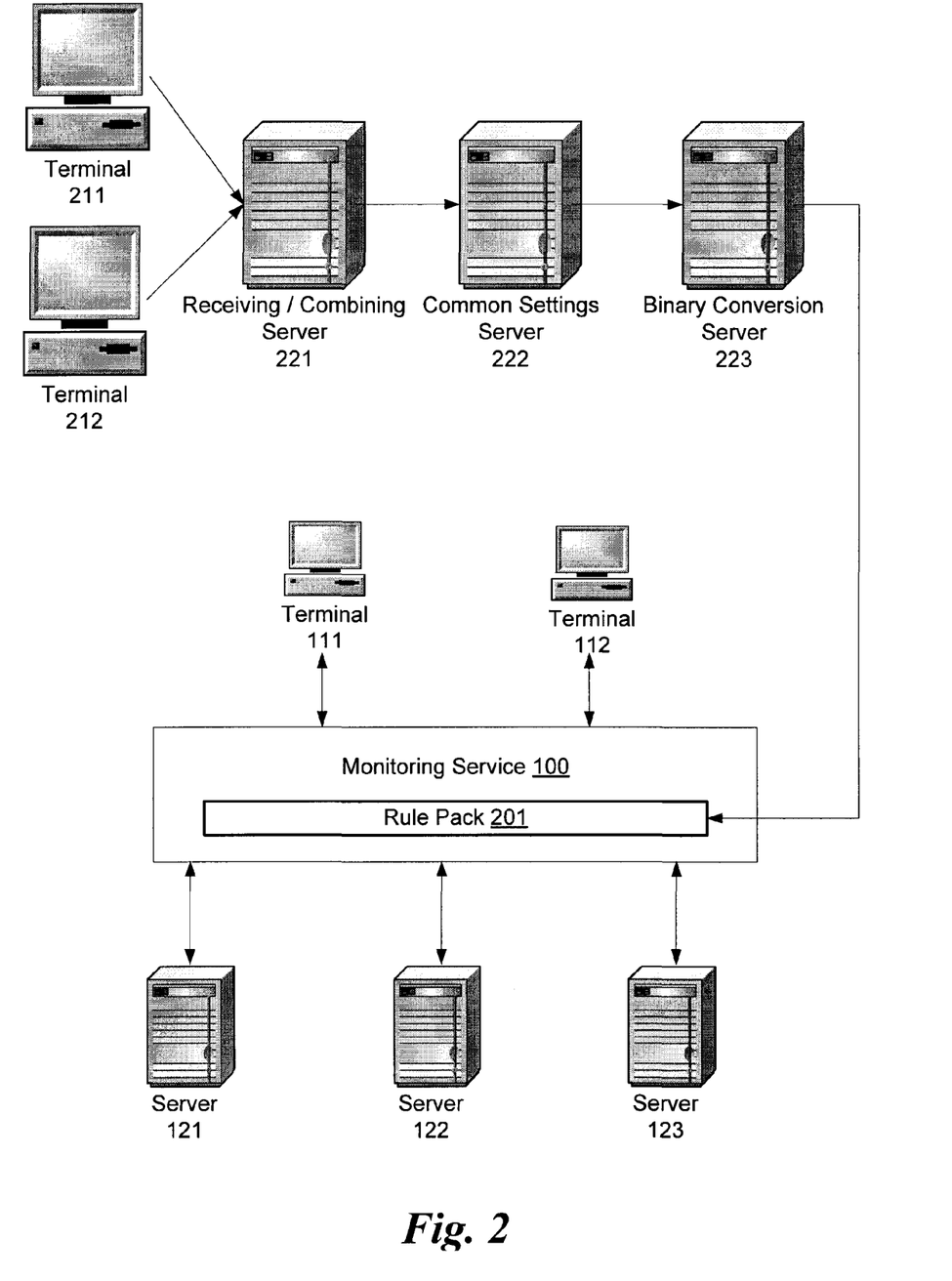
FIG. 2 illustrates various subsystems that may cooperate in producing a rule pack.

A monitoring service 100 may output reports, for example, using SQL Server 2000 Reporting Services. A monitoring service 100 can use such a product to provide highly customized reports. Reports can also be advantageously exported in formats supported by Microsoft Excel, Adobe Acrobat, HTML, TIFF, CSV, or XML file formats. Reports can be created and tailored through a product such as Visual Studio .NET FIG. 2 illustrates a system for generating a rule pack 201, said system comprising a plurality of subsystems 211, 212, 221, 222, 223. The output of the subsystems 211, 212, 221, 222, 223 may comprise a rule pack 201 with a plurality of monitoring rules for monitoring a computer such as servers 121, 122, 123, wherein a monitoring rule specifies an action to take in response to an event occurring (or performance criteria reaching a predefined threshold) in the monitored computer 121, 122, and/or 123.

A subsystem 221 may receive a plurality of monitoring rules specified in a markup language. A monitoring rule is generally a rule that specifies some event or other occurrence to monitor, and typically provides some action to take in response to such event, such as alerting a technician or automated process of the event. A monitoring rule may thus specify an event to monitor. A monitoring rule may also specify a counter to monitor. A monitoring rule may specify a counter threshold, for example, and require an alert to be sent when such threshold is met. A monitoring rule may specify an alert and properties of the alert. A monitoring rule may also specify a Global Unique Identifier (GUID) for the rule.

In one embodiment, a monitoring rule may be specified according to a rules schema as provided herein. The rules schema focuses on health monitoring. It describes the generic monitoring settings required to monitor events and performance counters that are relevant to all monitoring applications. For example, here is an example rule according to a contemplated schema. The rule provided below is for monitoring a Windows New Technology (NT) event that specifies the log name, event source, event ID and the severity of the alert that should be generated:

```
<Rule>
    <ID>{04D90464-29C1-4173-A767-1AEC56F270AA}</ID>
    <Name>The initialization process failed.</Name>
    <Event>
        <Log>Application</Log>
        <Source>MSADC</Source>
        <ID>8108</ID>
    </Event>
    <GenerateAlert>Warning</GenerateAlert>
</Rule>
```

Below is another exemplary rule according to a contemplated exemplary rules schema. The rule below is for monitoring a performance counter threshold. The rule specifies the performance counter object name, counter name, instance name, sample interval as well as which component's state the rule is associated with, and which threshold should generate a yellow (warning) alert and change the state to yellow:

```
<Rule>
    <ID>{072286BE-18C3-43FA-8560-FC8A7A2433F9}</ID>
    <Name>Exchange 2003: SMTP: Categorizer Queue > 50</Name>
    <PerfCounter>
        <ID>{86AD086F-7D0B-45F7-A02C-5B9737BC99E3}</ID>
        <ObjectName>SMTP Server</ObjectName>
        <CounterName>Categorizer Queue Length</CounterName>
        <InstanceName>_Total</InstanceName>
        <SampleIntervalInSeconds>60</SampleIntervalInSeconds>
    </PerfCounter>
    <State>
        <ServerRole>Exchange</ServerRole>
        <Component>Queues</Component>
        <YellowGT>50</YellowGT>
    </State>
</Rule>
```

Each rule for a rule pack may be saved in an XML rule manifest file. This way, the rules may be independently stored, managed, edited, looked up, and so forth. In general, a rules schema such as that used for the above exemplary rules is advantageously simple and descriptive enough to allow a non-monitoring expert, such as the feature owners for a particular component team, to easily provide the required information. This is advantageous in the development of a comprehensive monitoring solution because typically the developer of the solution does not have the same depth and breadth of knowledge of the product as the owner of the feature.

A rules schema such as that used for the above exemplary rules is also advantageously extensible, so as to facilitate inclusion of platform-specific settings. For example, some settings are not simplified by the schema and are instead stored in raw form in an "AdvancedSettings" node within an XML rule manifest file. This implementation can be easily applied to other monitoring applications. For example, one could save settings that are specific to a particular monitoring service 100, such as MOM, in a sub node of <AdvancedSettings> called <MOM>, and settings that are specific to another monitoring service, such as NetIQ, in a sub node called <NetIQ>.

When building a rule pack from the XML rule manifest files for a particular monitoring service, the relevant advanced settings for such service can be merged with generic health monitoring rules to create a monitoring service specific rule pack. This also allows the conversion from a monitoring service-specific rule pack to a simplified set of XML rule manifest files and back to the same monitoring service-specific rule pack again without losing any data. Furthermore, the schema is not platform-specific so a monitoring solution is not tied to any particular monitoring service like MOM. A monitoring solution for different monitoring services could be built from the same set of XML rule manifest files.

A subsystem 221 for receiving a plurality of monitoring rules may receive monitoring rules from two or more computer terminals 211, 212. The subsystem 221 may next combine the plurality of monitoring rules received by the subsystem 221 to produce a rule pack. The subsystem 221 for combining said plurality of monitoring rules may comprise, for example, a serve computer equipped with Integrated Development Environment (IDE) software allowing a plurality of software developers to develop said monitoring rules simultaneously. IDEs such as Microsoft's Visual Studio line of products provide many useful features that allow multiple developers to collaborate in creating software such as a rule pack in effective and powerful ways.

A subsystem 222 may next add to said rule pack at least one common setting. A common setting may be specified in a markup language, like the monitoring rules themselves, and may apply to two or more monitoring rules in the rule pack. A common setting may provide, for example, a setting for suppressing duplicate alerts. Common settings may be platform-specific, and the particular common settings that are added may be configured in a variety of ways. Common settings may be added by going through each rule in a rule pack, determining which common settings apply to that rule, and adding the common settings in one or more common settings nodes in the XML.

It is advantageous to provide automated systems for adding common settings to a rule pack and combining rules into a rule pack, as well as for performing the reverse operation, namely, breaking a rule pack back into individual XML rule manifest files that hide the common settings and can therefore be more easily viewed and edited. Approaches for performing both the forward and reverse operations are described herein.

Figure 4:
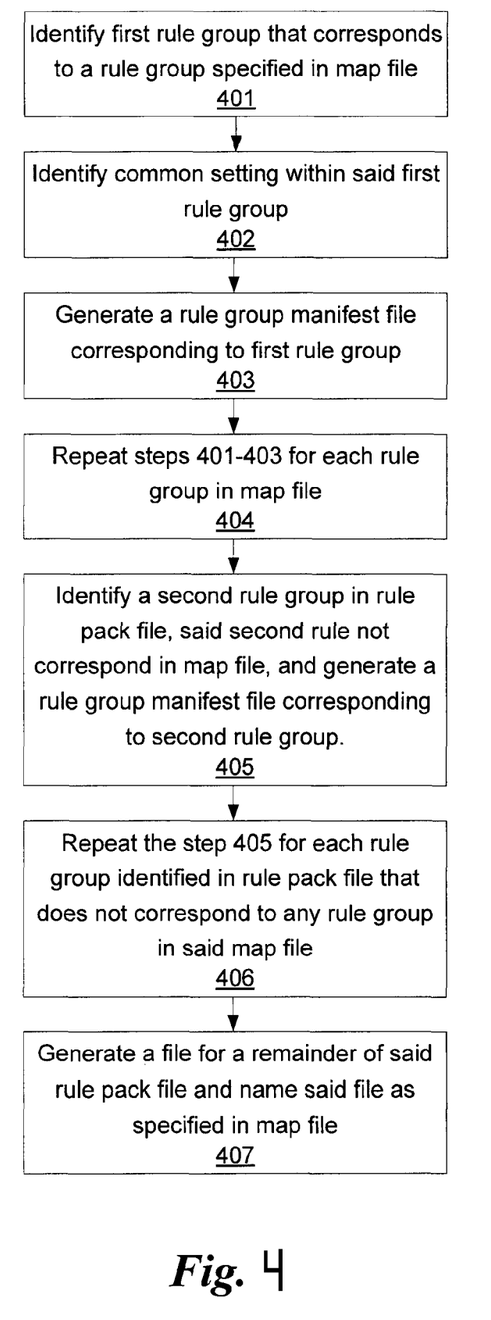
FIG. 4 illustrates an algorithm that combines XML rule manifest files with platform-specific common settings to build a rule pack solution for a monitoring service.

The subsystem 222 can utilize an algorithm such as that illustrated in FIG. 4 to break a rule pack complete with common settings into a plurality of more manageable XML rule manifest files. The exemplary algorithm uses a map file as discussed further below. The algorithm combines the XML rule manifest files with the platform-specific common settings to build a rule pack solution for a monitoring service. In general, with reference to FIG. 4, the algorithm may include the steps of identifying a first rule group in a markup language rule pack file that corresponds to a rule group specified in a markup language rule group map file 401; identifying a common setting within said first rule group, wherein a common setting applies to two or more monitoring rules in said a markup language rule pack file 402; generating a rule group manifest file corresponding to said first rule group, wherein said common setting is not visible from a default view of said rule group manifest file 403; repeating the steps above for each rule group specified in said markup language rule group map file 404; identifying a second rule group in said markup language rule pack file, wherein said second rule group does not correspond to any rule group specified in said markup language rule group map file, and generating a rule group manifest file corresponding to said second rule group 405; repeating step 405 for each rule group identified in said markup language rule pack file that does not correspond to any rule group specified in said markup language rule group map file; and generating a file for a remainder of said rule pack file and naming said file as specified in the map file 407.

An exemplary implementation of an algorithm such as that illustrated in FIG. 4 is as follows:

```
Read and validate the Rule Group Map file;
Read and validate the Rule Pack Base file specified in the Rule
    Group Map file to form the base of Rule Pack XML;
Read and validate the OtherRuleGroups file specified in the Rule
    Group Map file;
For each Rule Group in the OtherRuleGroups file
    Remove the subtree;
    Transform it to the Rules schema, re-generate all the
        simplified default settings if necessary;
    Insert it into Rule Pack XML according to its path
        specified in the Rule Group Map file;
For each Rule Group specified in the Rule Group Map file
    Read and validate the XML Rule Manifest file specified in
        the Rule Group Map file;
    Transform it to the Rule Pack XML schema, re-generate all
        the simplified default settings if necessary;
    Insert it into Rule Pack XML according to its path
        specified in the Rule Group Map file;
Read and validate the key definition XML;
Replace the foreign keys back in Rule Pack XML based on the key
    definitions(i.e. change the tree structure to the flat structure
    of Rule Pack XML, and change the references to IDs);
Save the Rule Pack XML
```

As suggested above, a map file may be utilized, along with an appropriate algorithm, to break down large, incomprehensible XML files such as the entire rule pack along with common settings, into smaller, logically self-contained, independent, schematized files for easy editing and source control over individual XML rule manifest files. Such a map file can associate nodes representing logical groups of rules in the rule pack file to individual XML rule manifest files, creating smaller files that are much more manageable.

The map file may further allow users to specify how the XML rule pack file should be split into the associated XML rule manifest files as well as how to combine the XML rule manifest files together to create a logically organized rule pack.

Here is a sample Rule Group Map file:

```
<?xml version="1.0"?>
<HealthManifestFiles>
  <Rule Pack Base>MPBase.xml</Rule Pack Base>
  <HealthManifests>
    <HealthManifest>
      <RuleGroupPath>Microsoft Exchange Server/Exchange 12/Front End/OWA</RuleGroupPath>
      <FileName>OWA.xml</FileName>
    </HealthManifest>
    ...
    </HealthManifest>
    ...
    </HealthManifest>
  </HealthManifests>
  <OtherRuleGroups>OtherRuleGroups.xml</OtherRuleGroups>
</Rule Pack Files>
```

An exemplary high-level algorithm to break down the rule pack into the XML rule manifest files is provided below. The implementation of the below algorithm is for MOM, but the algorithm can be applied to rule packs for any other monitoring service.

```
Read and validate the Rule Pack XML file;
Read and validate key definition XML file (see below);
Replace the foreign keys in Rule Pack XML based on the key
    definitions to get the nested tree structure as well as the
    friendly names for the references;
Read and validate the Rule Group Map XML file;
For each Rule Group specified in the Rule Group Map file
    (starting from the longest path)
        Remove the subtree from the Rule Pack XML;
        Transform it to the rules schema, simplify it by hiding
        common settings that are supplied by the conversion tool;
        Re-order the rules to preserve the existing order if the
            reference file exists;
        Save to the XML rule manifest file specified in the Rule
            Group Map file;
For each Rule Group that is not specified in the Rule Group Map
file
        Remove the subtree from the Rule Pack XML;
        Transform it to the rules schema, simplify it by hiding the
            default settings;
        Re-order the rules to preserve the existing order if the
            reference file exists;
        Save to the OtherRuleGroups file specified in the Rule
            Group Map file;
Save the remainder of the Rule Pack XML into a separate file
    (Rule Pack Base.xml) as specified in the Rule Group Map file
```

Another aspect of the invention may include a generic algorithm and a key definition schema to manipulate any key-based XML files. XML files commonly use a relational database concept to layout nodes, especially when the XML is streamed out of a relational database. The database table is mapped to an XML node and all its entries are mapped to child nodes. References are implemented via the key and foreign keys in the nodes.

When the data in a database is viewed or manipulated, it is quite easy to use JOIN to find the definitions of the foreign keys. However, that option is not available if the data is in XML, although it generally comprises the same set of tables and keys.

To resolve this problem, embodiments of the invention may utilize a generic algorithm that can transform any key-based XML files to a "joined" state where each foreign key is replaced by its key. The resulting XML is analogous to the JOIN operation in the relational database.

A key definition schema can be used to specify all the key-based entities. From the key definition file, the algorithm learns where to find keys, foreign keys and how they correlate to each other. If the foreign key is specified as inline, the algorithm will replace the key node with the foreign key node so that the keys may be viewed inline instead of having to search for them in a different part of the XML tree.

Here is a sample entry from an exemplary key definition file that follows an exemplary key definition schema:

```
<Identities>
  <Identity>
    <!-- xpath of the node "Key"-->
    <Path>/RulePack/RuleGroups/RuleGroup</Path>
    <!-- relative xpath of the node's ID -->
    <ID>RuleGroupID</ID>
    <!-- relative xpath of the node's friendly name. We will show this
    friendly name when it is referred as "Foreign Key" -->
      <FriendlyName>Name</FriendlyName>
    <!-- xpath of the references to the ID as foreign keys -->
    <ForeignKeys>
    <ForeignKey ShowInline='1'>
```

-continued

```
/ManagementPack/RuleGroups/RuleGroup/RGMEMBERS/
RuleGroupID
    </ForeignKey>
  </ForeignKeys>
  <!--specify custom UI control -->
  <FriendlyName>Name</FriendlyName>
  </Identity>
</Identities>
```

Here is an exemplary generic algorithm that can transform any key-based XML files to a "joined" state where each foreign key is replaced by its key:

```
For each key path (i.e. <Path>)
    Load all key instances by <Path> before we re-organize the
    nodes
For each foreign key path (i.e. <ForeignKey>)
    Load all foreign key instances before we re-organize the
    nodes
For each foreign key path
    For each instance
        Find its key node, matched by ID
        If this is a ShowInline foreign key
            Report error if the key is referenced multiple
            times
            Replace the foreign key node with the key node
        Else
            Replace the value with the <FriendlyName> of the
            key node
```

Figure 5:
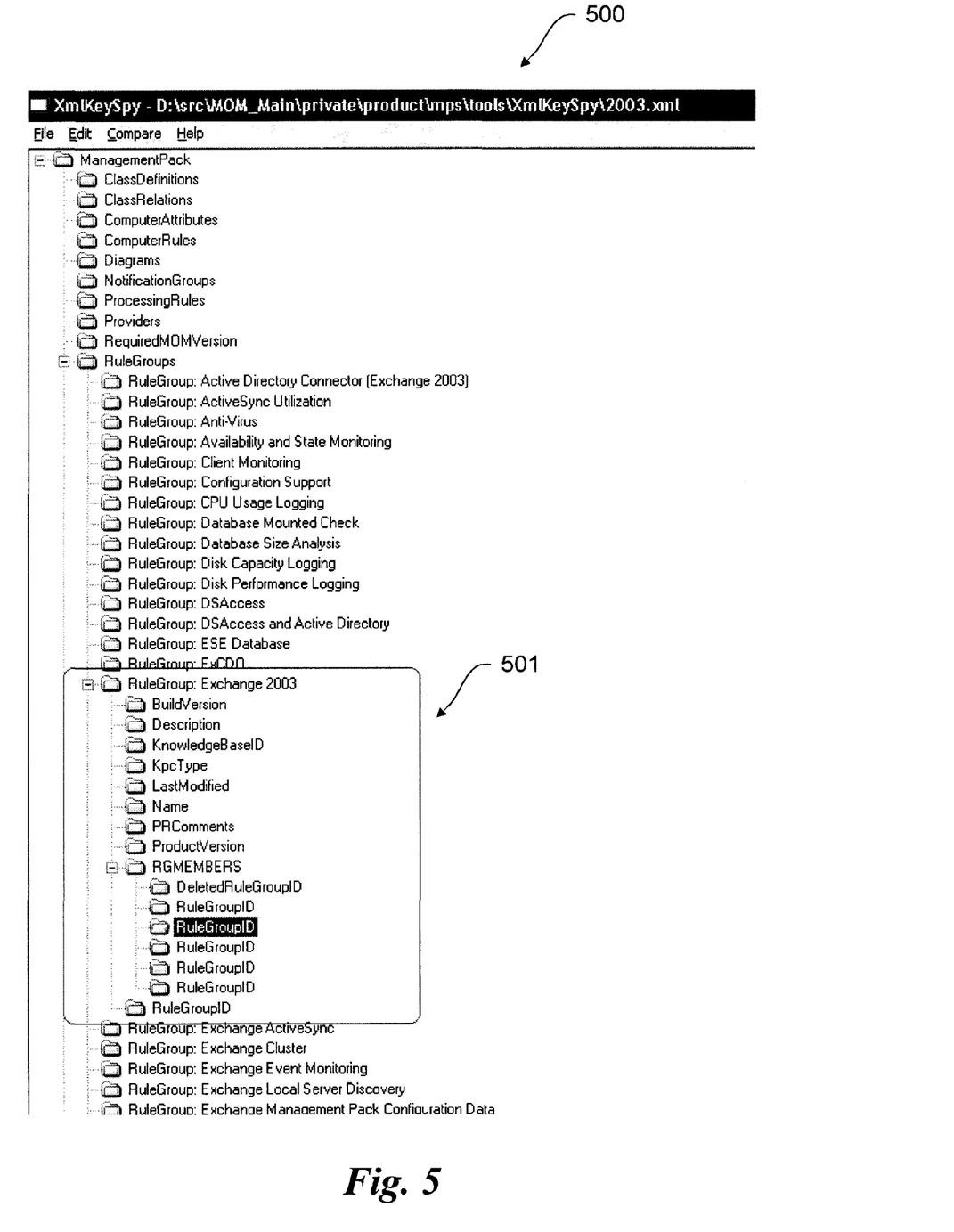
FIG. 5 illustrates a folder structure layout according to an XML file prior to applying an algorithm for converting any key-based XML files to a "joined" state where each foreign key is replaced by its key.
Figure 6:
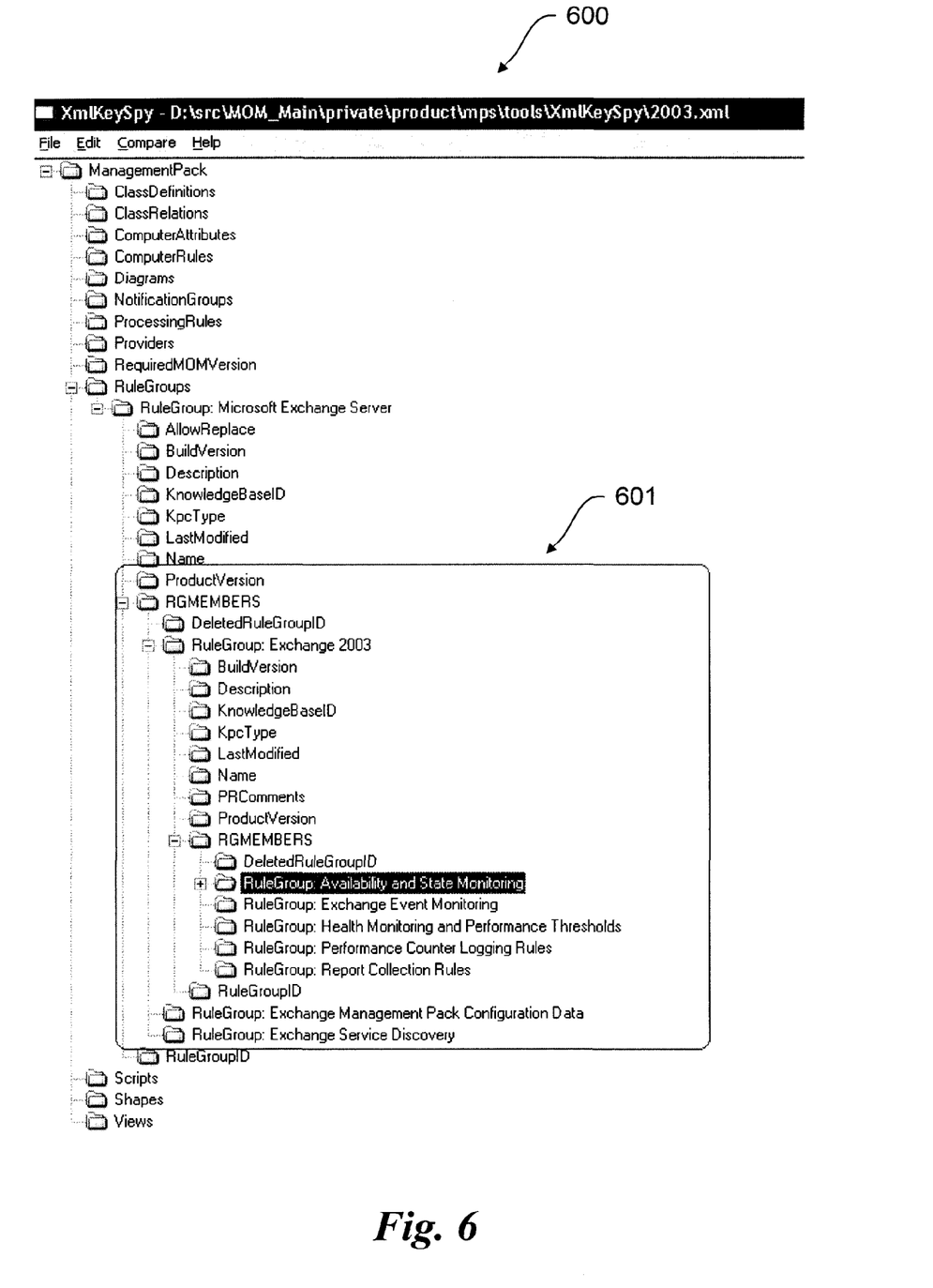
FIG. 6 illustrates a folder structure layout according to an XML file after applying an algorithm for converting any key-based XML files to a "joined" state where each foreign key is replaced by its key.

There is no hard-coded XML tag name in the above exemplary algorithm. The algorithm can apply to any XML schema as long as the keys are specified in a key definition file. FIGS. 5 and 6 demonstrate the transformation accomplished by this algorithm. FIG. 5 shows a display 500 including a folder structure according to an original XML file, prior to application of the algorithm. The portion 501 of the folder structure is particularly useful for comparison to an analogous portion 601 in FIG. 6. FIG. 6 shows a display 600 with a folder structure after the above algorithm is applied, using the above key definition file. The portion 601 now has richer structure including folders and subfolders corresponding to nodes and subnodes in an XML file. Thus the flat folder structure of FIG. 5 is transformed to the nested tree view structure with friendly names of FIG. 6.

This algorithm has some other potential usages. For example, it can be used in an XML editor so that the XML is shown in a nice nested tree view on the fly rather than the flat table-like structure. The user can change his view by simply modifying the key definition file. The key definition schema also provides a good platform to add other logic that may be desired to put on the keys. For example, one could also extend a key definition schema to add a <CustomControl> field to the key definition file and specify custom control (.Net or COM object) so that the XML editor knows what special UI Control it should use for that a given type of node. In our experiments, we specified the following control should be used for the key "Comment."

```
<CustomControl>
    <Assemebly>Microsoft.MOM.XmlKeySpy</Assemebly>
    <ControlName>KBEditor</ControlName>
</CustomControl>
```

The XML editor can then load the specified control when that key is shown.

Referring back to FIG. 2, a subsystem 223 may convert the markup-language rule pack from markup language to a binary file, using conventional techniques, for subsequent use by a monitoring service. Finally, subsystem 223 may deliver the rule pack to the monitoring service so that it can be used in monitoring operations. Of course, in environments that are not tightly integrated, it may be beneficial to omit this aspect of subsystem 223 and instead deliver the rule pack to a monitoring service manually, such as by saving it to a network drive and subsequently accessing it from monitoring service software, or saving or sending the rule pack binary by means of other computer readable media.

Figure 3:
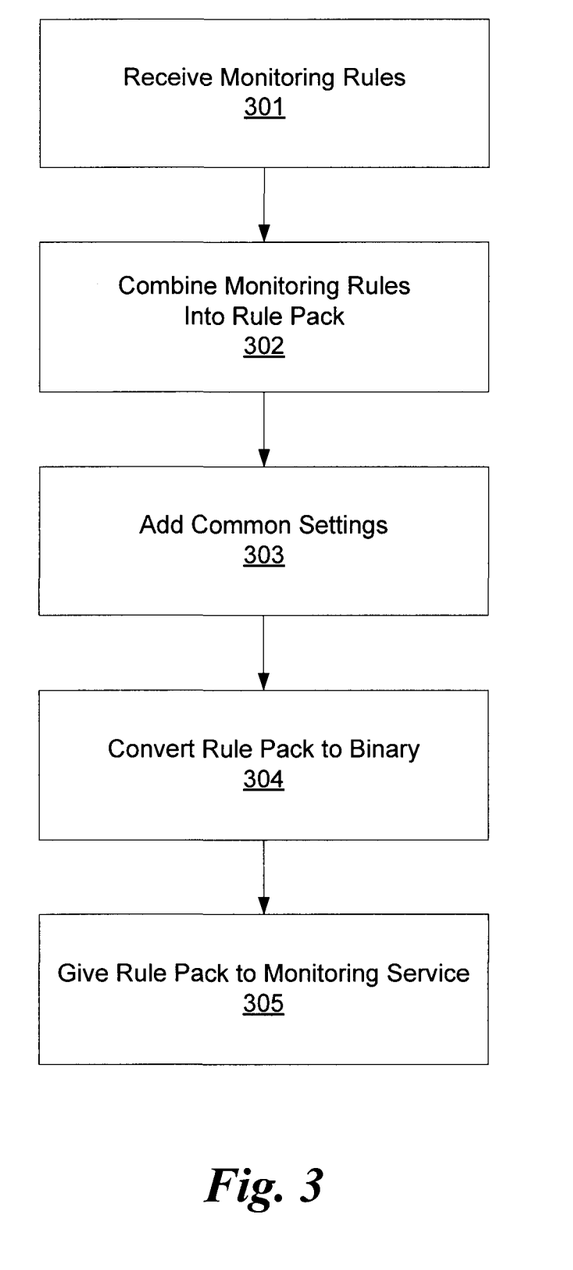
FIG. 3 illustrates a method for producing a rule pack using a system such as that illustrated in FIG. 2.

FIG. 3 illustrates a method for producing a rule pack using a system such as that illustrated in FIG. 2. In one embodiment, the various method steps may be embodied as instructions on computer readable media. The method of FIG. 3 should be understood at this point. It generally comprises receiving monitoring rules specified in a markup language 301, combining the rules into a rule pack 302, adding common settings to the rule pack 303, converting the rule pack to binary 304, and giving the rule pack to a monitoring service 305. It will be understood that the invention also comprises performing the method of FIG. 3 in reverse, thereby breaking a rule pack back into individual rules in easy to read markup language files for editing and so forth.

In light of the diverse computing environments that may be built, and the further diversification that can occur in computing in a network environment, it will be appreciated that the various systems, methods, and computer readable media disclosed herein cannot be limited to any particular hardware or software architecture. Instead, the present invention should not be limited to any single embodiment, but rather should be construed in breadth and scope in accordance with the appended claims.

The invention claimed is:

1. A system for generating a rule pack comprising a plurality of monitoring rules for monitoring a computer, said system comprising:
    at least one processor; and
    at least one memory storing processor-executable instructions that, when executed by the at least one processor, cause the at least one processor to implement:
        a subsystem for receiving said plurality of monitoring rules, said plurality of monitoring rules specified in a markup language, each of said plurality of monitoring rules associated with a respective one of a plurality of rule manifest files, wherein at least one of the plurality of rule manifest files includes a node comprising settings that are unique to a particular monitoring service;
        a subsystem for combining said plurality of monitoring rules to produce said rule pack, wherein said rule pack relates to performance criteria factors comprising at least one of average processor use, memory use, or percent of full disk space, wherein the combining comprises merging the settings that are unique to the particular monitoring service from the node of the at least one of the plurality of rule manifest files with generic health monitoring rules;
        a subsystem for adding to said rule pack at least one common setting that applies to two or more monitoring rules in said rule pack to specify how the two or more monitoring rules are applied, wherein adding to said rule pack said at least one common setting comprises evaluating a monitoring rule in said rule pack, determining whether a common setting applies to the evaluated monitoring rule, and, if so, adding the common setting in at least one common setting node; and a subsystem for converting said rule pack from said markup language to a binary file.

2. A system according to claim 1, wherein said subsystem for receiving said plurality of monitoring rules receives said plurality of monitoring rules from two or more computer terminals.

3. A system according to claim 1, wherein said subsystem for combining said plurality of monitoring rules comprises a server computer equipped with Integrated Development Environment (IDE) software allowing a plurality of software developers to develop said plurality of monitoring rules simultaneously.

4. A system according to claim 1, wherein at least one of said plurality of monitoring rules specifies an event to monitor.

5. A system according to claim 1, wherein at least one of said plurality of monitoring rules specifies a counter to monitor.

6. A system according to claim 1, wherein at least one of said plurality of monitoring rules specifies a counter threshold.

7. A method for generating a rule pack comprising a plurality of monitoring rules for monitoring a computer, said method comprising:

receiving, by a computer system, said plurality of monitoring rules, said plurality of monitoring rules specified in a markup language, each of said plurality of monitoring rules associated with a respective one of a plurality of rule manifest files, wherein at least one of the plurality of rule manifest files includes a node comprising settings that are unique to a particular monitoring service;

combining, by the computer system, said plurality of monitoring rules to produce said rule pack, wherein said rule pack relates to performance criteria factors comprising at least one of average processor use, memory use, or percent of full disk space, wherein the combining comprises merging the settings that are unique to the particular monitoring service from the node of the at least one of the plurality of rule manifest files with generic health monitoring rules;

adding, by the computer system, to said rule pack at least one common setting that applies to two or more monitoring rules in said rule pack to specify how the two or more monitoring rules are applied, wherein adding to said rule pack said at least one common setting comprises evaluating a monitoring rule in said rule pack, determining whether a common setting applies to the evaluated monitoring rule, and, if so, adding the common setting in at least one common setting node; and converting, by the computer system, said rule pack from said markup language to a binary file.

8. A method according to claim 7, wherein said receiving said plurality of monitoring rules comprises receiving said plurality of monitoring rules from two or more computer terminals.

9. A method according to claim 7, wherein said combining said plurality of monitoring rules comprises is carried out by a server computer equipped with Integrated Development Environment (IDE) software allowing a plurality of software developers to develop said plurality of monitoring rules simultaneously.

10. A method according to claim 7, wherein at least one of said plurality of monitoring rules specifies an event to monitor.

11. A method according to claim 7, wherein at least one of said plurality of monitoring rules specifies a counter to monitor.

12. A method according to claim 7, wherein at least one of said plurality of monitoring rules specifies a counter threshold.

13. A computer readable storage device having stored therein instructions that, upon execution by at least one processor of a computer system, cause the computer system to perform operations for generating a rule pack comprising a plurality of monitoring rules for monitoring a computer, said operations comprising:

receiving said plurality of monitoring rules, said plurality of monitoring rules specified in a markup language, each of said plurality of monitoring rules associated with a respective one of a plurality of rule manifest files, wherein at least one of the plurality of rule manifest files includes a node comprising settings that are unique to a particular monitoring service;

combining said plurality of monitoring rules to produce said rule pack, wherein said rule pack relates to performance criteria factors comprising at least one of average processor use, memory use, or percent of full disk space, wherein the combining comprises merging the settings that are unique to the particular monitoring service from the node of the at least one of the plurality of rule manifest files with generic health monitoring rules;

adding to said rule pack at least one common setting that applies to two or more monitoring rules in said rule pack to specify how the two or more monitoring rules are applied, wherein adding to said rule pack said at least one common setting comprises evaluating a monitoring rule in said rule pack, determining whether a common setting applies to the evaluated monitoring rule, and, if so, adding the common setting in at least one common setting node; and converting said rule pack from said markup language to a binary file.

14. A computer readable storage device according to claim 13, wherein said receiving said plurality of monitoring rules comprises receiving said plurality of monitoring rules from two or more computer terminals.

15. A computer readable storage device according to claim 13, wherein said combining said plurality of monitoring rules comprises is carried out by a server computer equipped with Integrated Development Environment (IDE) software allowing a plurality of software developers to develop said plurality of monitoring rules simultaneously.

16. A computer readable storage device according to claim 13, wherein at least one of said plurality of monitoring rules specifies an event to monitor.

17. A computer readable storage device according to claim 13, wherein at least one of said plurality of monitoring rules specifies a counter to monitor.

18. A computer readable storage device according to claim 13, wherein at least one of said plurality of monitoring rules specifies a counter threshold.

* * * * *